Aug. 24, 1965     JULIE CHI-SUN YANG ETAL     3,202,522
CEMENTITIOUS PRODUCT
Filed Dec. 28, 1961
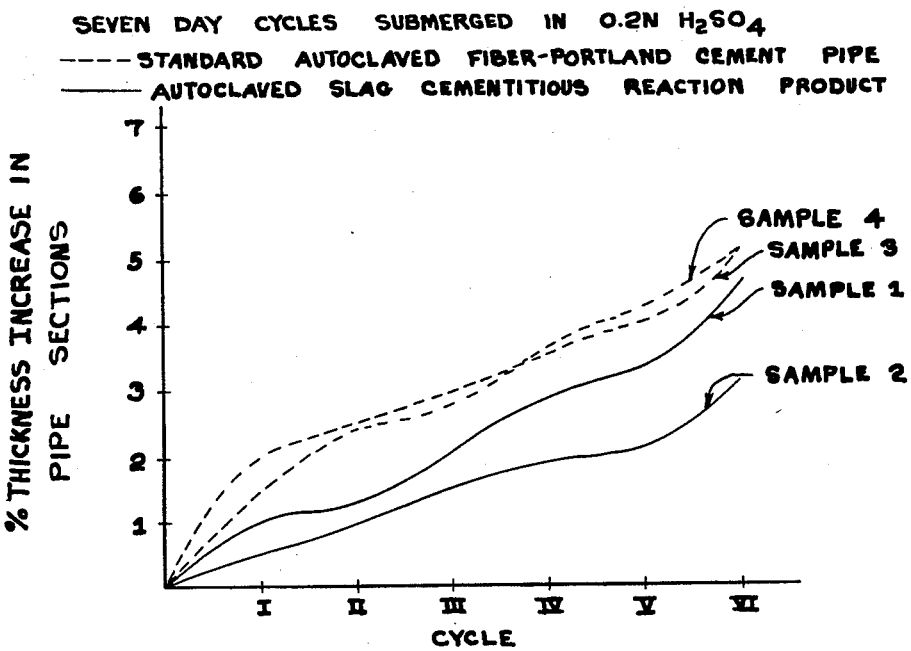
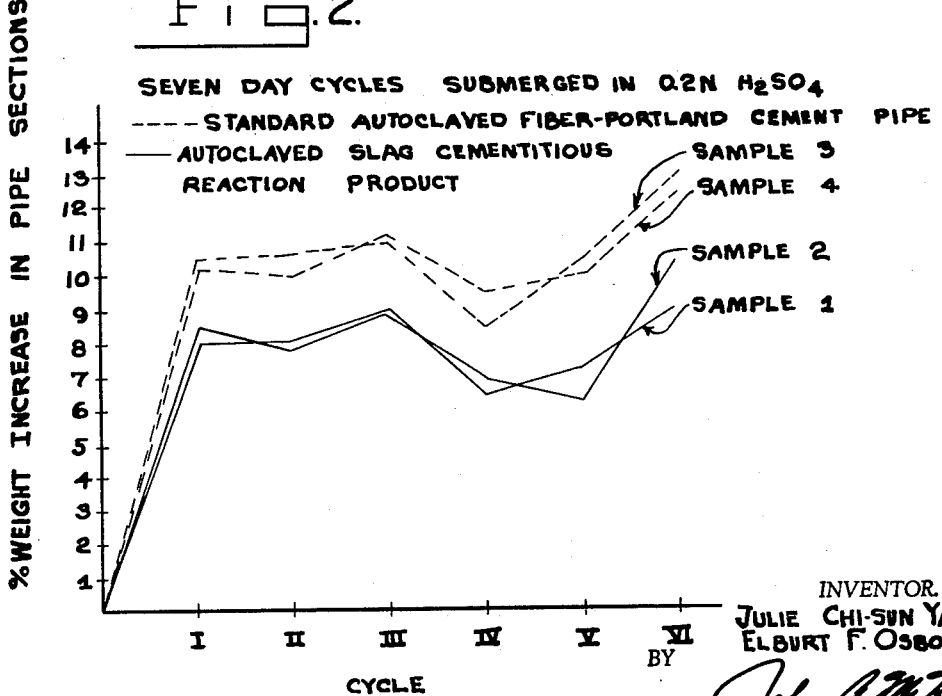
INVENTOR.
JULIE CHI-SUN YANG
ELBURT F. OSBORN
BY
ATTORNEY 3,202,522
Patented Aug. 24, 1965

3,202,522
CEMENTITIOUS PRODUCT
Julie Chi-Sun Yang, Middlesex, N.J., and Elburt F. Osborn, State College, Pa., assignors to Johns-Manville Corporation, New York, N.Y., a corporation of New York
Filed Dec. 28, 1961, Ser. No. 162,737
12 Claims. (Cl. 106—99)

This application is a continuation-in-part of our copending U.S. patent application, Serial No. 70,397, filed November 21, 1960, now abandoned.

This invention relates to a cementitious article of manufacture and hydrothermal process for the formation of the same, and more particularly to reinforced hydrated cementitious reaction products of improved chemical resistance and strength characteristics.

Conventional abestos-cement compositions and products composed thereof which typically comprise as the principal bonding medium Portland cement and, to a lesser but still highly deleterious degree, those cementitious materials which comprise the less common metallurgical slag cements such as illustrated by U.S. Letters Patent No. 1,627,237, consist of systems which contain relatively high proportions of constituents or phases such as free lime or sources thereof, ettringite, and the like, which are unstable in sulfates and/or dilute acid media. This characteristic and decided deficiency in resistance to sulfates and/or acids in such cementitious materials comprises a serious handicap in many common applications of abestos-cement products such, for example, as their use in the manufacture of pipe and the like, particularly when the product is used for sewer or industrial vent pipe or installed in aggressive soils or conditions.

It is a principal object of this invention to provide novel hydrated cementitious compositions of improved resistance to sulfates and dilute acids or media embodying the same, and with high mechanical strength.

It is also an object of this invention to provide more economical but highly effectual hydrothermally reacted, hydrated cementitous materials which consume and/or incorporate relatively high ratios of low cost silica in relation to the balance of the reactive components.

It is a further object of this invention to provide an efficient means of producing new and improved hydrated cementitious reaction products comprising hydrated calcium aluminum silicate systems which are substantially free from acid susceptible bonding phases or constituents such as ettringite or available lime, and which comprise bonding phases of high resistance to chemical attack and, in turn, provide a product of over-all resistance to aggressive or corrosive conditions or media.

The manner of attainment of these and other objects and advantages of this invention will become apparent from the following detailed description and annexed drawings wherein:

FIGS. 1 and 2 are graphs showing the comparative acid resistance of the product of this invention with conventional materials.

In accordance with the present invention, there have been found hydrated cementitious reaction products or compositions exhibiting the foregoing improved characteristics or properties, among others, which are formed by hydrothermally induced interreactions of hydrated cementitious materials or systems comprising fine granulated metallurgical slag, calcium silicate, silica, and, optionally, calcium sulfate, within the hereinafter prescribed relative proportions and conditions.

More specifically, the new hydrated cementitious product of this invention comprises the monolithic reaction product(s) of autoclaving a hydrated mass of an admixture of approximately 12.5%–85% by weight of finely ground granulated metallurgical slag with less than about 15% by weight thereof of crystalline content, approximately 0.25%–32% by weight of a hydrolyzable calcium silicate of at least about 2 mols of CaO per mol of $SiO_2$, approximately 0%–75% by weight of silica, and 0%–27.5% by weight of calcium sulfate. The autoclaving of the hydrated admixture or material comprises subjecting the same to a steam atmosphere of at least approximately 50 p.s.i.g. (about 150° C.) up to approximately 600 p.s.i.g. (about 250° C.) for a period of exposure depending primarily upon the extent of a pressure-temperature conditions, that is, for a period varying proportionately from at least about 2 hours to about 36 hours or longer.

The slag cement component comprises a granulated or quenched blast furnace slag or slag from similar metallurgical process which is of a glassy nature, or unoriented in structure, containing no more than about 15% by weight thereof of crystalline structure. To facilitate the hydration reaction, the slag is preferably ground to a size having a specific surface of approximately 3000–6500 $cm.^2/g.$ as derived by the Blaine test. Five exemplary slag cement products produced from ordinary water quneched blast furnace slag gave the following analysis:

| | A | B | C | D | E |
|---|---|---|---|---|---|
| | Percent | Percent | Percent | Percent | Percent |
| Ignition Loss (at 1,000° F.) | 0.47 | 0.55 | -------- | -------- | *1.7 |
| $SiO_2$ | 26.7 | 27.8 | 30.3 | 34.3 | 33.3 |
| CaO | 45.3 | 44.3 | 41.6 | 43.1 | 39.2 |
| MgO | 4.2 | 3.4 | 4.1 | 6.3 | 12.3 |
| $Al_2O_3$ | 11.8 | 12.0 | 14.4 | 10.2 | 10.7 |
| $TiO_2$ | 0.56 | 0.56 | 0.54 | 0.4 | 0.28 |
| $Fe_2O_3$ | 0.83 | 1.3 | 0.86 | 2.28 | 0.72 |
| $P_2O_5$ | 0.43 | 0.45 | 0.10 | 0.15 | 0.009 |
| $Na_2O$ | 0.56 | 0.45 | 0.34 | 0.19 | 0.19 |
| $K_2O$ | 0.49 | 0.53 | 1.1 | 0.19 | 0.17 |
| Total $SO_3$ | 7.5 | 6.9 | 5.92 | 0.09 | 0.22 |
| S | 0.89 | 0.91 | 0.95 | 1.41 | 1.2 |
| Trace materials ($B_2O_3$, BaO, $Mn_2O_3$) | 0.3 | 0.3 | -------- | -------- | 0.8 |
| | 100.0 | 99.9 | 100.21 | 100.21 | 100.79 |

(*At 1800° F.)

Although suitable ratios of this component may comprise approximately 12.5%–85% by weight of reactive constituents, it is preferred that the finely ground slag is employed in amounts of about 20%–50% by weight of said reactive materials.

The calcium silicate reactant comprises anhydrous or hydrated calcium silicate compounds having a solubility in water sufficient to provide at least 0.1 and preferably about 0.2 or more grams of CaO per liter and which are of a highly basic nature whereby they effectively attack the glassy slag particles to instigate and accelerate the decomposition of the slag particles and the formation of an extensive gel content having a structure with high bonding strength. Appropriate materials for this required function consist of hydrolyzable calcium silicates high in lime, viz., those silicates having a $CaO-SiO_2$ mol ratio of at least about 2 mols of lime per mol of silica, and desirably consist of the preferred tricalicum silicate, or β-dicalcium silicate, or compositions which readily provide such materials in aqueous media. Ordinarily Portland cements comprising up to about 70% by weight thereof of tricalcium silicate and β-dicalcium silicate, for example, constitute an economical and effective source or means of supplying these materials in the preferred, high lime containing tricalcium silicate and in the alternative β-dicalcium silicate forms. Although usefully employed in proportions ranging from 0.25%–32% by weight of these active constituents of the hydratable materials, these calcium silicates are more effective and therefore preferably utilized in this invention in amounts of about 3%–20% by weight of the active constitutents, or any suitable amount of Portland cement or similar source thereof providing a like quantity of said calcium silicate may be employed in lieu thereof.

Silica is to be included in any of its usual hydrothermally reactive forms, including siliceous materials such as sand, diatomaceous earth, quartz, silica gel, tripoli, etc., and mixtures thereof, and although effective in amounts ranging up to approximately 75% by weight of the reactants, it is desirably included in amounts of at least 10% by weight and preferably in amounts of from about 30%–50% by weight.

Calcium sulfate, when utilized, may be added either as plaster of Paris ($2CaSO_4 \cdot H_2O$) or anhydrite ($CaSO_4$) or any other suitable source thereof in hydrous media in the prescribed quantities of up to approximately 27.5% by weight of the reactive materials calculated upon the basis of anhydride material. Preferably it is employed in quantities of 2%–15% by weight thereof on the same basis.

Asbestos fiber is added and dispersed throughout the cementitious materials or constituents primarily as a mechanical reinforcement and in general serves the ordinary and like function as in common asbestos-Portland cement compositions or products thereof. The fibrous constituent may comprise from approximately 5%–50% by weight of the foregoing reactive components comprising the cementitious material, or preferably about 10%–40% by weight thereof.

Additionally, the cementitious admixture may include calcium carbonate as a partial replacement for silica in proportions of up to about 20% by weight of the reactive constituents or in a silica/calcium carbonate ratio of from 1.5 to 3. Calcium carbonate serves a dual function, that of providing an additional source of lime to instigate and accelerate the decomposition of the slag particles and in turn the hydration reaction(s), and also of an aggregate comprising the remaining unreacted material. Unreacted calcite within the cementitious product being more reactive or susceptible to corrosive acidic media than the cement grains and cement binders, the calcite particles would be attacked prior to the other components and the severity of the acid attack on the cementitious material would be diminished to a rather mild action.

For purposes of illustration rather than explanation or limitation, the chemical or physical-chemical mechanisms involved in the practice of the instant invention, as hypothesized in part upon the basis of numerous and extensive examinations and in part by inference drawn from detailed observations, are believed to comprise the following transformations and/or systems. The hydration and cohesive setting reaction(s) of common supersulfated slag cement compositions typically comprising about 80%–90% granulated blast furnace slag and about 10%–15% of calcium sulfate with an accelerator of up to about 5% of lime or source thereof, is initiated with the small amount of alkali present attacking the granulated slag particles and effecting a surface disintegration thereof which gradually releases the slag components in amorphous metastable hydrated oxide forms. These amorphous metastable hydrated oxides in turn interact readily with the available calcium silicate in the liquid phase taking up large quantities of water to form calcium sulfoaluminate hydrates comprising the metastable compound $3CaO \cdot Al_2O_3 \cdot CaSO_4 \cdot 13H_2O$, and ettringite $$(3CaO \cdot Al_2O_3 \cdot 3CaSO_4 \cdot 31H_2)$$

This reaction can generally be illustrated as follows:

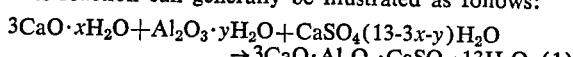
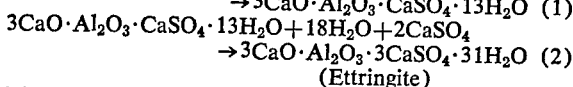

(Ettringite)

The fine grain form of the sulfoaluminates produced provide gel structures of high binding strength. However, although ettringite is relatively resistant to sulfate-bearing salt solution such as $CaSO_4$, this compound and low temperature sulfoaluminates are especially susceptible to acid attack with the big complex ettringite molecule readily decomposable in acidic media, especially sulphuric acid solutions. The acid decomposition reaction of ettringite produces gypsum which is accompanied by an appreciable volume expansion which is particularly destructive to products such as pipe.

In the initial stages of hydration of finely divided blast furnace slag of the instant invention, the calcium silicate (e.g., tricalcium silicate or $\beta$-dicalcium silicate or source thereof) hydrolyzes rapidly producing large proportions of calcium silicate hydrate gels (CSHI) and high concentrations of lime (e.g., providing an alkalinity of the medium up to the pH of a saturated $Ca(OH)_2$ solution of pH 12.4) which aggressively and rapidly attacks and decomposes the slag particles. The hydration of tricalcium silicate at room temperature in water can be represented by the equation:

$$3CaO \cdot SiO_2 + (n+2)H_2O$$
$$\rightarrow CaO \cdot SiO_2 \cdot nH_2O + 2Ca(OH)_2$$

The calcium silicate hydrolysis product(s), in addition to forming a high gel content and gel structure of high bonded strength characteristics, combines with the amorphous hydrated alumina phases present, forming stable, chemically inert compounds. Under autoclaving conditions the highly reactive amorphous hydrous phases comprising hydrous alumina and silica gel resulting from the action of the hydrolyzed calcium silicate upon the slag, in turn react with the excess of lime to form, as identified by X-ray analysis, a crystalline calcium silicate tobermorite ($4CaO \cdot 5SiO_2 \cdot 5H_2O$) and hydrogarnet species with the ettringite phase found in normal cured hydrated products decomposed to the point where it cannot be detected in the product by instrumental means. The tobermorite-like calcium silicate hydrate (CSHI) resulting from the hydration reaction of the calcium silicate contributes high bonding strength to the cementitious body, and the hydrogarnets, which are especially noted for their chemical resistance to acid and sulfate action including sulfuric acid, impart chemical resistance.

Systems comprising the desired chemically resistant hydrogarnet phases can be formed without calcium silicate, but only at the relatively high temperature-pressure autoclaving conditions of approximately 200° C. and 210 p.s.i.g. over periods of about 24 hours or more and even under such excessive conditions tobermorite is formed only in relatively small quantities. The introduction of calcium silicate, preferably tricalcium silicate or other readily hydrolyzable sources thereof high in lime, results in the formation of hydrogarnets at the relatively low temperature-pressure conditions of 140° C. and 55 p.s.i.g. and effects the formation of large amounts of tobermorite in the system, which provides high strength characteristics.

The following examples illustrate the present invention, including several variations in the practice of the same, and compare this invention with certain known prior art practices or techniques outside the scope of this invention. It is to be understood that the examples hereinafter set forth are given for the purpose of illustration rather than limitation, and that the specific constituents or compositions produced therefrom and techniques or procedures set forth are merely exemplary and are not to be construed to limit this invention to any particular means of practicing the same.

EXAMPLE I

A number of sag cake test samples were prepared comprising the following constituents in the recited proportions which were hydrated either without or with subsequent autoclaving under the conditions given in the accompanying Tables I, II and III. The slag cement employed in each sample was a quenched, granulated

Table I
STRENGTH RESULTS OF SAG CAKES WITHOUT AND WITH CALCIUM SILICATE

| Composition (percent) | | | | Curing conditions | | | MR (p.s.i.) | Dry density (p.c.f.) |
|---|---|---|---|---|---|---|---|---|
| Asbestos fiber | Slag | Calcium silicate | Silica | °C. | p.s.i. | hrs. | | |
| 20 | 40 | ---------- | 40 | [1] RT | --- | [2] 28 | 2,310 | 81.8 |
| 20 | 40 | ---------- | 40 | 80 | --- | 24 | 2,200 | 82.2 |
| 20 | 40 | ---------- | 40 | 97 | --- | 70 | 2,260 | 82.0 |
| 20 | 40 | ---------- | 40 | 130 | 35 | 24 | 1,780 | 82.0 |
| 20 | 40 | ---------- | 40 | 145 | 55 | 24 | 2,880 | 82.9 |
| 20 | 40 | ---------- | 40 | 170 | 100 | 16 | 2,880 | 83.6 |
| 20 | 40 | ---------- | 40 | 183 | 150 | 24 | 3,230 | 83.3 |
| 20 | 40 | ---------- | 40 | 190 | 170 | 24 | 3,490 | 83.7 |
| 20 | 40 | ---------- | 40 | 200 | 210 | 24 | 3,530 | 83.9 |
| 20 | 40 | ---------- | 40 | 220 | 350 | 24 | 3,180 | 83.0 |
| 20 | 40 | ---------- | 40 | 250 | 565 | 17 | 2,420 | 82.7 |
| 20 | 27 | ---------- | 53 | 200 | 210 | 24 | 1,930 | 81.0 |
| 20 | 36.8 | [3] 3.2% C₃S | 40 | 183 | 150 | 24 | 3,820 | 83.9 |
| 20 | 34 | 6.0% C₃S | 40 | 183 | 150 | 24 | 3,900 | 84.5 |
| 20 | 36 | [4] 4% P.C. | 40 | 183 | 150 | 24 | 3,810 | 84.2 |
| 20 | 34 | 6% P.C. | 40 | 183 | 150 | 24 | 3,630 | 84.3 |
| 20 | 32 | 8% P.C. | 40 | 183 | 150 | 24 | 3,630 | 84.7 |
| 20 | 34 | ---------- | 40 | 170 | 100 | 24 | 3,420 | 84.7 |
| 20 | 32 | ---------- | 40 | 170 | 100 | 24 | 3,180 | 84.3 |
| 20 | 36 | ---------- | 40 | 200 | 210 | 24 | 3,510 | 84.6 |
| 20 | 50% P.C. | ---------- | 30 | 170 | 100 | 16 | 3,380 | 83.6 |
| | | | | (control sample) | | | | |

[1] RT = Room temp.
[2] Days.
[3] C₃S = Tricalcium silicate.
[4] P.C. = Portland cement.

Table II
STRENGTH RESULTS OF SAG CAKES WITH CALCITE AND PORTLAND CEMENT

| Composition (percent) | | | | | Curing conditions | | | MR (p.s.i.) | Dry density (p.s.i.) |
|---|---|---|---|---|---|---|---|---|---|
| Asbestos fiber | Slag | Portland | SiO₂ | CaCO₃ | °C. | p.s.i. | hrs. | | |
| 20 | 64 | ---- | ---- | 16 | 170 | 100 | 24 | 2,940 | ---- |
| 20 | 64 | ---- | ---- | 16 | 183 | 150 | 24 | 2,600 | ---- |
| 20 | 48 | ---- | 16 | 16 | 183 | 150 | 24 | 3,320 | 82.7 |
| 20 | 40 | ---- | 20 | 20 | 183 | 150 | 24 | 3,720 | ---- |
| 20 | 34.3 | ---- | 34.3 | 11.4 | 183 | 150 | 24 | 3,310 | 83.4 |
| 20 | 36 | 4 | 20 | 20 | 183 | 150 | 24 | 3,670 | ---- |
| 20 | 36 | 4 | 24 | 16 | 183 | 150 | 24 | 3,610 | 85.6 |
| 20 | 36 | 4 | 30 | 10 | 183 | 150 | 24 | 3,760 | ---- |
| 20 | 20.9 | 3.4 | 34.3 | 11.4 | 183 | 150 | 24 | 3,720 | 83.6 |
| 20 | 32.0 | 8.0 | 30 | 10 | 183 | 150 | 24 | 3,770 | 85.8 |
| 20 | 36 | 4 | 30 | 10 | 200 | 210 | 24 | 3,840 | 85.1 |
| 20 | 34.3 | ---- | 34.3 | 11.4 | 200 | 210 | 24 | 3,320 | 82.7 |
| 20 | 30.9 | 3.4 | 34.3 | 11.4 | 230 | 400 | 24 | 3,470 | 82.6 |
| 20 | ---- | 50 | 30 | ---- | 170 | 100 | 16 | 3,380 | 82.6 |
| | | | | | (control sample) | | | | |

Table III
STRENGTH RESULTS OF SAG CAKES WITHOUT AND WITH CALCIUM SULFATE

| Composition (percent) | | | | | Curing conditions | | | MR (p.s.i.) |
|---|---|---|---|---|---|---|---|---|
| Asbestos fiber | Silica | Slag | Portland cement | CaSO₄ | °C. | p.s.i. | hrs. | |
| 20 | ------ | 68 | 12 (National Type I). | 0 | 172 | 110 | 24 | 3,465 |
| 20 | ------ | 60 | 20 (National Type I). | 0 | 172 | 110 | 24 | 3,435 |
| 20 | 40 | 30 | 10 (National Type I). | 0 | 172 | 110 | 24 | 4,380 |
| 20 | 40 | 30 | 10 (Universal Atlas Type III). | 0 | 172 | 110 | 24 | 3,900 |
| 20 | 40 | 30 | 10 (Incor Type V) | 0 | 172 | 110 | 24 | 4,130 |
| 20 | 40 | 30 | 10 (National Type I). | 0 | 172 | 110 | 24 | 3,670 |
| 20 | 40 | 30 | 10 (National Type I). | 0 | 172 | 110 | 24 | 4,440 |
| 20 | 40 | 38 | 2 (National Type I). | 0 | 183 | 150 | 24 | 4,290 |
| 20 | 40 | 26 | 10 (National Type I). | 4 | 183 | 150 | 24 | 4,320 |
| 20 | 40 | 28 | 4 (National Type I). | 8 | 183 | 150 | 24 | 4,280 |
| 20 | 30 | 37.5 | 12.5 (National Type I). | 0 | 172 | 110 | 24 | 3,650 |
| 20 | 36 | 33 | 11 (National Type I). | 0 | 172 | 110 | 24 | 3,660 |
| 20 | 44 | 27 | 9 (National Type I). | 0 | 172 | 110 | 24 | 3,540 | blast furnace slag having the composition D set forth hereinbefore (slag from U.S. Steel's South Works near Chicago) ground to a Blaine fineness of about 4500 cm.²/g. Curing conditions for all samples comprised a 16 hours moist air cure followed either by the normal air cure specified or a steam cure according to the prescribed conditions.

EXAMPLE II

Relative acid resistance of the fiber reinforced cementitious compositions of this invention and of conventional fiber reinforced Portland cement compositions were compared as follows. The hydrothermally reacted slag compositions comprised hydrated admixtures of 45% by weight of a ground granulated metallurgical slag having a composition of C given above with 5% by weight of Portland cement and 50% by weight of silica combined with 28% by weight of the said reactive ingredients, of asbestos fiber, precured 16 hours in moist air and autoclaved at a pressure of 150 p.s.i.g. for 24 hours. The fiber-Portland cement compositions comprised a standard commercial formulation of 62.5% Portland cement and 37.5% of silica mixed with 28% by weight thereof of asbestos reinforcing fiber precured 16 hours in moist air and autoclaved at 100 p.s.i.g. for 16 hours. Test specimens comprised segments 2 in. x 2 in. cut from pipe sections manufactured from each according to the prescribed compositions and conditions. Each test specimen, wax sealed on exposed transverse cut edges to prevent acid attack and penetration in all directions other than those of the normally exposed interior and exterior surfaces, was completely submerged in 0.2N $H_2SO_4$ for a series of 7 day cycles. Each cycle was begun and completed by a determination of the increase in thickness transversely through the sections from the outer exposed surface to the inner exposed surface, specimen weight increase, and penetration depth of acid or reaction products thereof. During each cycle the acid concentration was titrated back to 0.2 N each of 5 days of the 7-day cycle and each new cycle was begun with fresh acid. The results are given in tabular form in Tables IV, V, and VI hereinafter, and both the comparative thickness increase and comparative weight increase are illustrated in FIGS. 1 and 2 respectively. Samples 1 and 2 comprises specimens taken from pipe manufactured from the hydrothermal reaction product of this invention and samples 3 and 4 comprise specimens taken from conventionally manufactured asbestos-Portland cement pipe.

Table VI
DEPTH OF PENETRATION

| Sample | Original sound portion, inch | Final sound portion, inch | Percent sound portion left |
|---|---|---|---|
| 1 | 19/32 | 11/32 | 58 |
| 2 | 20/32 | 12/32 | 60 |
| 3 | 19/32 | 12/32 | 63 |
| 4 | 19/32 | 12/32 | 63 |

EXAMPLE III

Pipe formed on conventional asbestos-Portland cement machines, was manufactured pursuant to this invention from a slurry comprising 37.5% by weight of slag having a composition of D given above, ground to a Blaine fineness of about 4500 cm.²/g., 12.5% by weight of Portland cement and 50% by weight of silica, with 23.5% by weight of the foregoing asbestos; or, 35% by weight of the same slag, 12% by weight of Portland cement, 2.5% by weight of calcium sulfate, and 50% by weight of silica, also with 23.5% by weight thereof of asbestos. Due to the slower setting characteristics of slag cements the pipe formed therefrom ran slightly softer than asbestos-Portland cement pipe on the forming machine, but the composition and formation were otherwise satisfactory as employed in a routine forming procedure. Upon removal from the forming mandrel, the pipe was moist air cured for 5 hours and then autoclaved at 110 p.s.i.g. for 24 hours. These runs established that the hydrothermal composition of this invention can be satisfactorily and effectively employed in the manufacture of asbestos-cement pipe according to conventional techniques and producing an improved product of lower cost.

It is to be understood that the present disclosure is for purposes of illustration only and that this invention includes all modifications and equivalents which fall within the scope of the appended claims.

What we claim is:

1. A fiber reinforced, cementitious article of manufacture of the monolithic, hydrothermal reaction product of autoclaving a hydrated mass of an admixture consisting essentially of:
   (a) approximately 12.5%–85% by weight of ground granulated blast furnace slag having a crystalline content of less than about 15% by weight thereof,
   (b) approximately 0.25%–32% by weight of calcium silicate having a water solubility providing at least

Table IV
EXPANSION OF THICKNESS

| Sample | Initial Thickness X10⁻³ | Cycle I | Diff. | Percent diff. | Cycle II | Diff. | Percent diff. | Cycle III | Diff. | Percent diff. | Cycle IV | Diff. | Percent diff. | Cycle V | Diff. | Percent diff. | Cycle VI | Diff. | Percent diff. |
|---|---|---|---|---|---|---|---|---|---|---|---|---|---|---|---|---|---|---|---|
| 1 | 595 | 601 | 6 | 1.01 | 602 | 7 | 1.18 | 607 | 12 | 2.02 | 612 | 17 | 2.86 | 614 | 19 | 3.19 | 621 | 27 | 4.53 |
| 2 | 616 | 619 | 3 | .49 | 622 | 6 | .97 | 625 | 9 | 1.46 | 628 | 12 | 1.95 | 628 | 12 | 1.95 | 635 | 19 | 3.08 |
| 3 | 591 | 603 | 12 | 2.02 | 605 | 14 | 2.41 | 608 | 17 | 2.88 | 612 | 21 | 3.55 | 614 | 24 | 3.90 | 621 | 30 | 5.07 |
| 4 | 592 | 601 | 9 | 1.52 | 606 | 14 | 2.41 | 608 | 16 | 2.70 | 614 | 22 | 3.72 | 617 | 25 | 4.23 | 622 | 30 | 5.07 |

Table V
CHANGE OF WEIGHT

| Sample | Initial Weight gm. | Cycle I | Diff. | Percent diff. | Cycle II | Diff. | Percent diff. | Cycle III | Diff. | Percent diff. | Cycle IV | Diff. | Percent diff. | Cycle V | Diff. | Percent diff. | Cycle VI | Diff. | Percent diff. |
|---|---|---|---|---|---|---|---|---|---|---|---|---|---|---|---|---|---|---|---|
| 1 | 111.5 | 120.8 | 9.3 | 8.35 | 120.6 | 9.1 | 8.16 | 121.6 | 10.1 | 9.06 | 118.8 | 7.3 | 6.50 | 119.7 | 8.2 | 7.36 | 121.8 | 10.3 | 9.24 |
| 2 | 119.5 | 129.9 | 10.4 | 8.70 | 128.9 | 9.4 | 7.87 | 130.4 | 10.9 | 9.11 | 127.8 | 8.3 | 6.95 | 127.1 | 7.6 | 6.36 | 132.1 | 12.6 | 10.55 |
| 3 | 119.2 | 132.0 | 12.8 | 10.70 | 132.1 | 12.9 | 10.80 | 132.6 | 13.4 | 11.20 | 129.5 | 10.3 | 8.63 | 131.9 | 12.7 | 10.65 | 135.0 | 15.8 | 13.25 |
| 4 | 117.2 | 129.5 | 12.3 | 10.50 | 129.3 | 12.1 | 10.30 | 130.4 | 13.2 | 11.30 | 128.6 | 11.4 | 9.72 | 129.3 | 12.1 | 10.30 | 132.2 | 15.0 | 12.80 |

0.1 gram of CaO per liter and at least 2 mols of CaO per mol of SiO$_2$,
(c) approximately 0%–75% by weight of silica, and
(d) approximately 0–27.5% by weight of calcium sulfate,
(e) with reinforcing inorganic fiber dispersed throughout said admixture in amount of approximately 5%–50% by weight thereof,
at pressures of at least approximately 50 p.s.i.g. up to approximately 600 p.s.i.g. for periods of at least about 2 hours up to about 36 hours varying proportionately with the pressure.

2. A fiber reinforced, cementitious article of manufacture of the monolithic, hydrothermal reaction product of autoclaving a hydrated mass of an admixture consisting essentially of:
(a) approximately 20%–50% by weight of ground granular blast furnace slag having a crystalline content of less than about 15% by weight thereof,
(b) approximately 3%–20% by weight of calcium silicate having a water solubility providing at least about 0.2 gram of CaO per liter and at least 2 mols of CaO per mol of SiO$_2$,
(c) approximately 10%–50% by weight of silica, and
(d) approximately 2%–15% by weight of calcium sulfate,
(e) with reinforcing inorganic fiber dispersed throughout said admixture in amount of approximately 10%–40% by weight thereof,
at pressures at least approximately 50 p.s.i.g. up to approximately 600 p.s.i.g. for periods of at least about 2 hours up to about 36 hours varying proportionately with the pressure.

3. A fiber reinforced, cementitious article of manufacture of the monolithic, hydrothermal reaction product of autoclaving a hydrated mass of an admixture consisting essentially of:
(a) approximately 12.5%–85% by weight of ground granulated blast furnace slag having a crystalline content of less than about 15% by weight thereof,
(b) approximately 0.25%–32% by weight of calcium silicate having a water solubility providing at least 0.1 gram of CaO per liter and at least 2 mols of CaO per mol of SiO$_2$,
(c) approximately 10%–75% by weight of silica, and
(d) approximately 0%–27.5% by weight of calcium sulfate,
(e) with reinforcing inorganic fiber dispersed throughout said admixture in amount of approximately 5%–50% by weight thereof,
at pressures of approximately 100 p.s.i.g.–200 p.s.i.g for periods of about 16 hours–24 hours varying proportionately with the pressure.

4. A fiber reinforced, cementitious article of manufacture of improved acid resistance having hydrated calcium-aluminum-silicate systems with bonding phases to tobermorite and hydrogarnets, and less than about 0.5% by weight thereof of ettringite, said hydrated systems consisting essentially of the monolithic reaction product of a hydrated mass of an admixture consisting essentially of:
(a) approximately 12.5%–85% by weight of ground granulated blast furnace slag having a crystalline content of less than about 15% by weight thereof,
(b) approximately 0.25%–32% by weight of calcium silicate with a water solubility providing at least about 0.2 gram of CaO per liter and at least 2 mols of CaO per mol of SiO$_2$,
(c) approximately 10%–75% by weight of silica, and
(d) approximately 0%–27.5% by weight of calcium sulfate,
(e) with reinforcing inorganic fiber dispersed throughout said admixture in amount of approximately 5%–50% by weight thereof,
hydrothermally reacted at pressures of at least approximately 50 p.s.i.g. up to approximately 600 p.s.i.g. for periods of at least about 2 hours up to about 36 hours varying proportionately with the pressure.

5. A fiber reinforced, cementitious article of manufacture of improved acid resistance having hydrated calcium-aluminum-silicate systems with bonding phases of tobermorite and hydrogarnets, and less than about 0.5% by weight thereof of ettringite, said hydrated systems consisting essentially of the monolithic reaction product of a hydrated mass of an admixture consisting essentially of:
(a) approximately 20%–50% by weight of ground granulated blast furnace slag having a crystalline content of less than about 15% by weight thereof,
(b) approximately 3%–20% by weight of calcium silicate with a water solubility providing at least about 0.2 gram of CaO per liter and at least 2 mols of CaO per mol of SiO$_2$,
(c) approximately 30%–50% by weight of silica, and
(d) approximately 2%–15% by weight of calcium sulfate,
(e) with reinforcing fiber dispersed throughout said admixture in amount of approximately 10%–40% by weight thereof,
hydrothermally reacted at pressures of at least approximately 50 p.s.i.g. to approximately 600 p.s.i.g. for periods of at least about 2 hours to about 36 hours varying proportionately with the pressure.

6. The method of producing fiber reinforced cementitious articles of manufacture of improved acid resistance which includes hydrothermally forming a hydrated reaction product having bonding phases of tobermorite and hydrogarnets, and less than about 0.5% by weight thereof of ettringite, said method comprising autoclaving a hydrated mass of an admixture consisting essentially of:
(a) approximately 12.5%–85% by weight of ground granulated blast furnace slag having a crystalline content of less than about 15% by weight thereof,
(b) approximately 0.25%–32% by weight of calcium silicate with a water solubility providing at least 0.1 gram of CaO per liter and at least 2 mols of CaO per mol of SiO$_2$,
(c) approximately 0%–75% of silica, and
(d) approximately 0%–27.5% by weight of calcium sulfate,
(e) with reinforcing inorganic fiber in amount of approximately 5%–50% by weight of the hydrated mass,
at pressures of at least approximately 50 p.s.i.g. to approximately 600 p.s.i.g. for periods of at least about 2 hours to about 36 hours varying proportionately with the pressure.

7. The method of producing fiber reinforced cementitious articles of manufacture of improved acid resistance which consists of hydrothermally forming a hydrated reaction product having bonding phases of tobermorite and hydrogarnets, and less than about 0.5% by weight thereof of ettringite, said method comprising autoclaving a hydrated mass of an admixture consisting essentially of:
(a) approximately 12.5%–85% by weight of ground granulated blast furnace slag having a crystalline content of less than about 15% by weight thereof,
(b) approximately 0.25%–32% by weight of calcium silica with a water solubility providing at least about 0.2 gram of CaO per liter and at least 2 mols of CaO per mol of SiO$_2$,
(c) approximately 10%–75% by weight of silicate, and
(d) approximately 0%–27.5% by weight of calcium sulfate,
(e) with reinforcing inorganic fiber in amount of approximately 5%–50% by weight of the reactive mass,
at pressures of approximately 100 p.s.i.g.–150 p.s.i.g. for periods of about 16 hours–24 hours varying proportionately with the pressure.

8. The method of producing fiber reinforced cementitious articles of manufacture of improved acid resistance which consists of hydrothermally forming a hydrated reaction product having bonding phases of tobermorite and hydrogarnets, and less than about 0.5% by weight thereof of ettringite, said method comprising autoclaving a hydrated mass of an admixture consisting essentially of:
  (a) approximately 20%–50% by weight of ground granulated blast furnace slag having a crystalline content of less than about 15% by weight thereof,
  (b) approximately 3%–20% by weight of calcium silicate with a water solubility providing at least about 0.2 gram of CaO per liter and at least 2 mols of CaO per mol of $SiO_2$,
  (c) approximately 30%–50% by weight of silica, and
  (d) approximately 2%–15% by weight of calcium sulfate,
  (e) with reinforcing inorganic fiber in amount of approximately 10%–40% by weight of the reactive mass,
at pressures of at least approximately 50 p.s.i.g. to approximately 600 p.s.i.g. for periods of at least about 2 hours to about 36 hours varying proportionately with the pressure.

9. The method of producing fiber reinforced cementitious articles of manufacture of improved acid resistance which consists of hydrothermally forming a hydrated reaction product having bonding phases of tobermorite and hydrogarnets, and less than about 0.5% by weight thereof of ettringite, said method comprising autoclaving a hydrated mass of an admixture consisting essentially of:
  (a) approximately 20%–50% by weight of ground blast furnace slag having a crystalline content of less than about 15% by weight thereof,
  (b) approximately 3%–20% by weight of calcium silicate with a water solubility providing at least about 0.2 gram of CaO per liter and at least 2 mols of CaO per mol of $SiO_2$,
  (c) approximately 30%–50% by weight of silica, and
  (d) approximately 2%–15% by weight of calcium sulfate,
  (e) with reinforcing inorganic fiber in amount approximately 10%–40% by weight of the reactive mass,
at pressures of approximately 100 p.s.i.g.–150 p.s.i.g. for periods of about 16 hours–24 hours varying proportionately with the pressure.

10. The method of producing fiber reinforced cementitious articles of manufacture consisting essentially of hydrated calcium-aluminum-silicate systems having bonding phases of tobermorite and hydrogarnets, and less than about 0.5% by weight thereof of ettringite, said method comprising hydrothermally reacting at pressures of approximately 100 p.s.i.g.–150 p.s.i.g. for periods of about 16 hours–24 hours varying proportionately with the pressure, cementitious hydration reaction products consisting essentially of:
  (a) approximately 12.5%–85% by weight of ground granulated blast furnace slag having a crystalline content of less than about 15% by weight thereof,
  (b) approximately 0.25%–32% by weight of calcium silicate having a water solubility providing at least about 0.2 gram of CaO per liter and at least 2 mols of CaO per mol of $SiO_2$,
  (c) approximately 30%–50% by weight of silica, and
  (d) approximately 0%–27.5% by weight of calcium sulfate,
  (e) admixed with reinforcing inorganic fiber in amount of approximately 5%–50% by weight thereof.

11. The method of producing fiber reinforced cementitious articles of manufacture of improved acid resistance which comprises destroying the ettringite bonding phases of calcium-aluminum-silicate systems of the reaction products formed by the hydration of reactive masses of approximately 12.5%–85% by weight of ground granulated blast furnace slag having a crystalline content of less than about 15% by weight thereof, approximately 0.25%–32% by weight of calcium silicate having a water solubility providing at least about 0.2 gram of CaO per liter and at least 2 mols of CaO per mol of $SiO_2$, approximately 10%–75% by weight of silica, and 0%–27.5% by weight of calcium sulfate, admixed with reinforcing inorganic fiber in amount of approximately 5%–50% by weight thereof, and forming therein acid resistant bonding phases of tobermorite and hydrogarnets within said hydrated calcium-aluminum-silicate systems by autoclaving the same at a pressure of approximately 100 p.s.i.g.–600 p.s.i.g. for periods of about 2 hours–24 hours varying proportionately with the pressure.

12. The method of producing fiber reinforced cementitious articles of manufacture of improved acid resistance which comprises destroying the ettringite bonding phases of calcium-aluminum-silicate systems of the reaction products formed by the hydration of reactive masses of approximately 20%–50% by weight of ground granulated blast furnace slag having a crystalline content of less than about 15% by weight thereof, approximately 3%–20% by weight of calcium silicate having a water solubility providing at least about 0.2 gram of CaO per liter and at least 2 mols of CaO per mol of $SiO_2$, approximately 30%–50% by weight of silica, and 2%–15% by weight of calcium sulfate, admixed with reinforcing inorganic fiber in amount of approximately 5%–50% by weight thereof, and forming therein acid resistant bonding phases of tobermorite and hydrogarnets within said hydrated calcium-aluminum-silicate systems by autoclaving the same at a pressure of approximately 100 p.s.i.g.–150 p.s.i.g. for periods of about 16 hours–24 hours varying proportionately with the pressure.

References Cited by the Examiner

UNITED STATES PATENTS

| | | | |
|---|---|---|---|
| 2,084,354 | 6/37 | Morbelli | 106—99 |
| 2,446,990 | 8/48 | Schuetz | 106—99 |
| 2,597,370 | 5/52 | Peckman | 106—117 |
| 8,880,101 | 3/59 | Ulfstedt | 106—98 |
| 2,967,780 | 1/61 | Schneiter | 106—109 |
| 2,987,407 | 6/61 | Ulfstedt et al. | 106—117 |

OTHER REFERENCES

Lea & Desch: The Chemistry of Cement and Concrete (1956), published by Edward Arnold, Ltd., London (pages 17, 177, 420–425).

TOBIAS E. LEVOW, *Primary Examiner.*

UNITED STATES PATENT OFFICE
CERTIFICATE OF CORRECTION

Patent No. 3,202,522                                                   August 24, 1965

Julie Chi-Sun Yang et al.

It is hereby certified that error appears in the above numbered patent requiring correction and that the said Letters Patent should read as corrected below.

Column 1, line 33, for "industrical" read -- industrial --; column 2, line 11, for "a" read -- the --; line 16, for "process" read -- processes --; line 23, for "quneched" read -- quenched --; line 58, for "tricalicum" read -- tricalcium --; same column 2, lines 68 and 71, for "constitutents", each occurrence, read -- constituents --; column 3, line 65, for "($3CaO \cdot Al_2O_3 \cdot 3CaSO_4 \cdot 31H_2$)" read -- ($3CaO \cdot Al_2O_3 \cdot 3CaSO_4 \cdot 31H_2O$) --; columns 5 and 6, Table II, tenth column, line 3 of the heading thereof, for "(p.s.i.)" read -- (p.c.f.) --; same Table II, tenth column, line 14 thereof, for "82.6" read -- 83.6 --; column 7, line 45, for "comprises" read -- comprise --; columns 7 and 8, Table IV, sixteenth column, line 3 thereof, for "24" read -- 23 --; column 9, line 56, for "to" read -- of --; column 12, line 1, for "30%-50%" read -- 10%-75% --.

Signed and sealed this 21st day of June 1966.

(SEAL)
Attest:

ERNEST W. SWIDER                                        EDWARD J. BRENNER
Attesting Officer                                     Commissioner of Patents